United States Patent [19]

Yuasa et al.

[11] Patent Number: 4,601,571

[45] Date of Patent: Jul. 22, 1986

[54] EXPOSURE DETERMINING DEVICE FOR AN ENLARGER

[75] Inventors: Yoshio Yuasa, Osaka; Nobukazu Kawagoe, Sakai, both of Japan

[73] Assignee: Minolta Camera Kabushiki Kaisha, Osaka, Japan

[21] Appl. No.: 525,565

[22] Filed: Aug. 22, 1983

[30] Foreign Application Priority Data

Aug. 24, 1982 [JP] Japan .................. 57-147247

[51] Int. Cl.$^4$ ............................................. G03B 27/80
[52] U.S. Cl. ........................................ 355/38; 355/68; 356/404
[58] Field of Search .................... 355/38, 35-37, 355/68, 67, 77; 356/404

[56] References Cited

U.S. PATENT DOCUMENTS

| | | | |
|---|---|---|---|
| 3,640,620 | 2/1972 | Shatz et al. | 355/38 |
| 3,813,158 | 5/1974 | Zahn et al. | 355/68 X |
| 4,205,918 | 6/1980 | Kisanuki et al. | 355/38 |
| 4,469,437 | 9/1984 | Yuasa et al. | 355/38 X |

Primary Examiner—L. T. Hix
Assistant Examiner—Della Rutledge
Attorney, Agent, or Firm—Price, Gess & Ubell

[57] ABSTRACT

An enlarger having a light emitting device is provided wherein the amount and color balance of light to be emitted are controlled. The operator can set the amount and color balance of light. The enlarger can measure the amount and color balance of light at a plurality of points within a predetermined plane in which the printing paper is to be located. A first mode of operation can be set which presumes a predetermined standard film set in the enlarger and a second mode of operation can be set wherein a film to be printed is placed in the enlarger. The enlarger is capable of averaging a measured signal to determine an average amount and an average color balance of light wherein these measurements can be utilized to determine a proper amount and color balance of light to be received at the predetermined plane during an enlarging operation.

12 Claims, 4 Drawing Figures

EXPOSURE DETERMINING DEVICE FOR AN ENLARGER

BACKGROUND OF THE INVENTION

1. Field of the Invention

The present invention relates to an exposure determining device which determines the proper amount of exposure for each primary color in printing a picture of a color negative film on a color paper or in printing a picture of a monochrome film on a variable contrast paper such as Poly contrast paper (Eastman Kodak Co.), Varigam (Du Pont Co.,), Multigrade (Ilford Co.), and multitone Yoshino (Konishiroku Co.), the determined amount of exposure being used for controlling the amount of light to be emitted from the light source of an enlarger and or indication of the proper amount of exposure of the enlarger or the amount of light emission from the light source thereof.

2. Description of the Prior Art

In order to obtain a proper color print from a color negative film, the following method has been known. At first, a predetermined standard negative film is printed in various exposure conditions until a best print, i.e., a print that is thought or judged as best, is obtained. Under the condition where the best print is obtained, the amount of exposure and the color balance on the easel of the enlarger are measured with a color balance indicating device such as shown in U.S. Pat. No. 4,205,918. Next, a color negative film to be printed is set in the enlarger instead of the standard negative film. Then, under the condition where the color negative film to be printed (hereinafter, called the printing negative film) is set, the amount of exposure and the color balance on the easel are measured with the color balance indicating device again. The light intensity and the color balance of the light emitted from the light source of the enlarger is controlled so that the amount of exposure and the color balance measured for the printing negative film are coincided with that measured for the standard negative film.

However, the above conventional device is constructed to measure a specific area of an image formed on the easel because the light receiving surface of the device is smaller than the area in which the image would be formed. Therefore, in the conventional method, the exposure amount and the color balance within a specific area of the image of the printing negative film are compared with the exposure amount and the color balance within a specific area of the image of the standard negative film. Therefore, if the condition for a measuring point for the image of the printing negative film is different from the condition for a measuring point for the image of the standard negative film, a proper color print would not be obtained for the printing negative film. For example, with respect to both measuring points on the images of the standard and printing negative films, if a measuring point is selected for shadow portion of an image and another measuring point is selected for high light portion of another image, or if the persons photographed on each negative films are conspicuously different in skin color from each other although both measuring points are selected for the skins of the persons photographed on each negative film, the above impropriety would occurred.

To avoid this, it is necessary that the printing negative film has an area on which the condition is the same as the condition on the measuring point for the standard negative film and that such area on the printing negative film must be found out by an operator. Namely, the above impropriety would be avoided by setting the measuring point for the printing negative film on the image of such area. However, it takes skill to find out, in the printing negative film, the area on which the condition is the same as the condition of the measuring point for the standard negative film, and to locate the light receiving surface of the color balance indicating device on the image of said area. Furthermore, in this method, it must be required for the operator to memorize the condition on the measuring point for the standard negative film, and such requirement is an inconvenience for the operator.

On the other hand, another method for obtaining a proper color print from the printing negative film has been known. In such method, the whole image of the printing negative film is recognized as a pattern in order to judge how the printing negative film has been photographed (for example, whether the film has been photographed in a room or outdoors, or whether the film has been photographed under the daylight or under the flash light). The proper amount of exposure and the proper color balance in printing the printing negative film is determined in accordance with the result of the judgement. Nevertheless, in this case, when the reproduction of the specific part in the picture is desired, no proper indication for such a small portion will be provided because such method is to measure the entire of the picture image. Accordingly, the adjustment of the light source can be made only by a skilled operator who observe the negative film image and determine the exposure condition based on his experience.

SUMMARY OF THE INVENTION

An object of the present invention is to provide a device which can determine properly the exposure amount and color balance with simple operation without requiring skill.

Another object of the present invention is to provide an enlarger which is capable of providing a proper print whose exposure amount and color balance is determined properly in accordance with a film to be printed.

BRIEF DESCRIPTION OF THE DRAWINGS

FIGS. 1 to 4 show a color enlarger utilizing an embodiment of the present invention, wherein

DESCRIPTION OF THE PREFERRED EMBODIMENT

A detailed description of the embodiment illustrated is made as follows. In this embodiment, the present invention is applied to a color enlarger of the color additive type. In the embodiment, the color enlarger includes three flash discharge tubes each coupled with one of three color filters for primary colors respectively. Therefore, three flash discharge tubes and three color filters form a red light source emitting red light, a green light source emitting green light, and a blue light source emitting blue light, respectively. The emitting number of each of three flash discharge tubes are determined in accordance with input data as described below in order to obtain the proper exposure amount and the proper color balance for a printing negative film.

Figure 1:
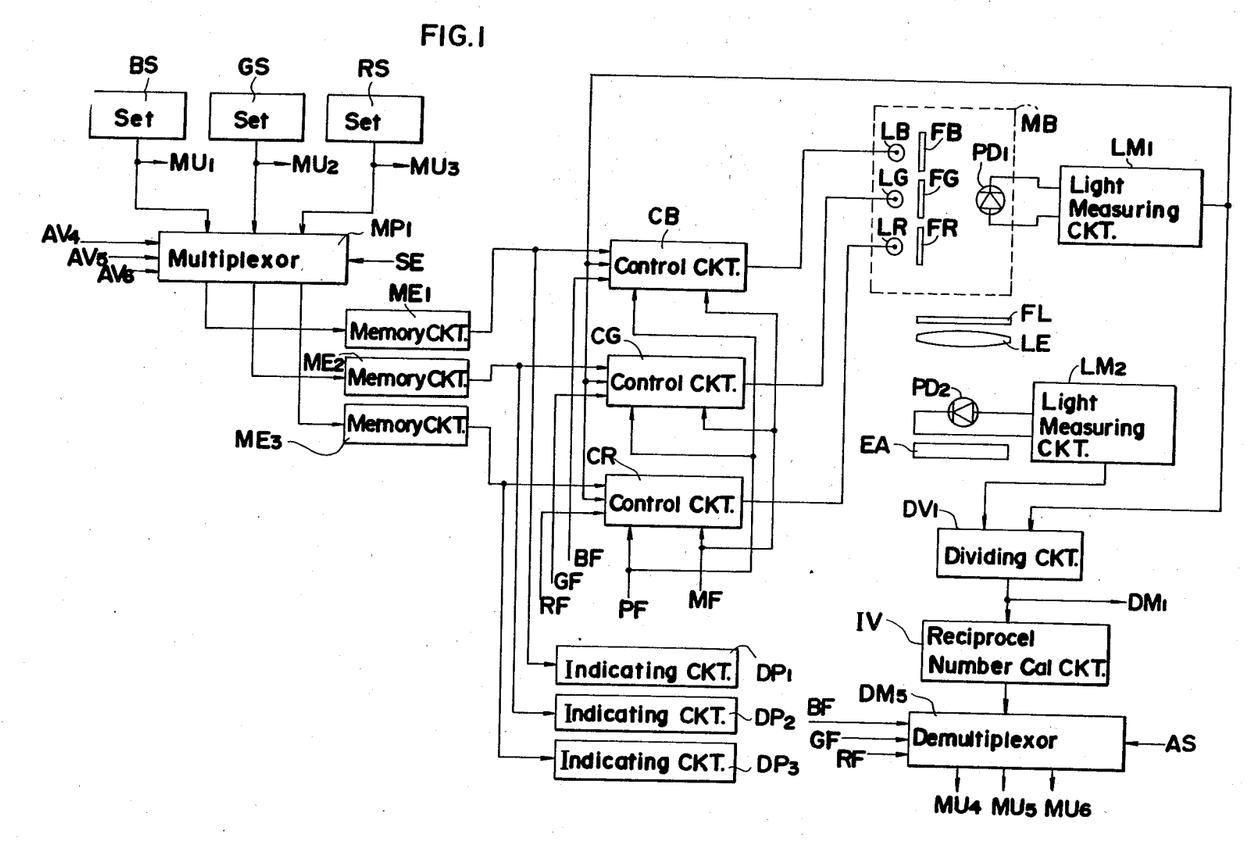
FIG. 1 is a block diagram showing the essential parts of the printing device.

In FIG. 1, in front of flash discharge tubes LB, LG, and LR are respectively disposed filters FB, FG and FR for allowing the passage of only blue, red and green light respectively. Therefore, light sources for the blue, green and red light are constructed by the combination of the flash tube LB with the filter FB, the flash tube LG with the filter FG and the flash tube LR with the filter FR respectively. The primary color lights emanated from the respective light sources are made uniform in the mixing box MB and projected to the color negative film located at film position FL.

The light rays that have passed through color negative film located at film position FL are led to the easel plane EA or a printing paper placed on the easel EA by image forming lens LE and an image of the color negative film is formed on the easel plane EA or on the printing paper. BS, GS, and RS represent the setting sections for manually setting the amount of the light to be emitted from the flash discharge tubes LB, LG, and LR respectively. In the aforementioned reference characters, B, G, and R indicate that they are related to the light of blue, green and red respectively. (It should be noted that the similar coding will be used for other parts too.) The output data from the setting sections BS, GS, and RS are respectively memorized by the respective memory circuits ME1, ME2, and ME3 through multiplexor MP1.

Signal control circuit CA comprises logic circuits, microprocessor, etc., to generate as described later, control signals from predetermined setting terminals in accordance with the ON and OFF of the switches arranged at the right side of the illustration shown in FIG. 2.

Circuits CB, CG, and CR control the amount of light to be emitted from the flash tubes LB, LG, and LR, respectively. The circuits activate their related flash tubes in response to a "High" signal generated from the output terminal MF of the control circuit CA according to the ON and OFF of exposure starting switch STS in FIG. 2 and control the amount and the number of times of their light emission as follows. First, an explanation is made by taking the light emitting control circuit CB for the blue light as an example. Assuming the total light emitting amount prescribed at the setting section BS is XB, light emitting control circuit CB will first activate the flash tube LB to emit flash light plural times based on the data of the 1st light emitting amount $fB1 = XB/16$ which is obtained by shifting the data of XB by 4 bits. At this time, the amount monitored by light receiving element PD1 located in the mixing box MB for monitoring and light measuring circuit LM1 connected therewith, are sequentially deducted at every light emitting time from the remaining total amount of light emission.

Now assuming the above monitored amount upon the i-th time light emission of flash tube LB is MB1i (i=1, 2, ...) and also assuming the remaining amount of light emission obtained by deducting the total sum of the monitored amounts up to the light emission of the ith time from the prescribed total amount XB is XB1i, light emitting control circuit CB computes $$XB - MB11 = XB11$$

after the light emission of the first time and further computes $$XB11 - MB12 = XB12$$

after the light emission of the second time. By repeating the similar operation, at the light emission of the Kth time control circuit CB computes $$XB1(k-1) - MB1k = XB1k$$

wherein $XB = XB10$.

When the remaining amount XB1k becomes less than half of the prescribed total light emitting amount XB, i.e., $$XB1k < 8.fB1 = XB/2$$

the light emission control circuit CB will shift the first light amount data fB1 for the flash tube LB by 1 bit and activate flash tube LB to emit light plural times based on the data of the second light amount data fB2 which is half of the light amount data fB1. Here, assuming the amount monitored in the light emission of the ith time from the flash tube LB based on the second light amount data fB2 is MB2i (i=1, 2, ...) and the remaining light amount is XB2i, light emission control circuit CB computes $$XB1k - MB21 = XB21$$

after the light emission of the first time. Similarly, $XB21 - MB22 = XB22$ is computed after the light emission of the second time and $XB2(l-1) - MB2l = XB2l$ is computed after the light emission of the lth time. When the remaining light amount XB2l becomes less than twice of fB2, light emission control circuit CB converts the second light amount data fB2 into the third light amount data of $fB3 = fB2/2$. Flash tube LB is activated to emit light plural times based on the third light amount data fB3. Now, assuming the amount monitored in the light emission of the ith time (i=1, 2, ...) by flash tube LB based on the third light amount data fB3 is MB3i, and the remaining light amount is XB3i, light emission control circuit CB computes $$XB2l - MB31 = XB31$$

after the light emission of the first time. Similarly, after the light emission of the second time, $$XB31 - MB32 = XB32$$

is computed. After the light emission of the mth time, $$XB3(m-1) - MB3m = MB3m$$

is computed.

When $XB3m \leq 0$ is attained, light emission control circuit CB stops the light emission of flash tube LB. Here, the ratio of the third light amount fB3 to the prescribed total light emitting XB is $$fB3/XB \leq \frac{1}{16} \cdot \frac{1}{2} \cdot \frac{1}{2} = 1/64 = 1.56\%$$

Consequently, the error rate caused by the fluctuations of the light amount emitted from flash tube LB remains at a low level of less than two percent, i.e., below 1 cc. This could result in attainment of a high precision of the prescribed total amount XB of light emission. The foregoing explains the light emission control operation of flash tube LB by light control circuit CB. A similar control operation is performed by control circuits CG and CR for the green and red light sources for flash tubes LG and LR respectively. Such control operations can be performed by the microprocessor. Although detailed explanation for such operations are omitted here since it is irrelevant to the essense of the present invention, a detailed explanation for those control operations will be found in a Japanese patent application No. Sho 56-200496.

In FIG. 1, light receiving element PD1 is installed inside mixing box MB for monitoring the amounts of lights emitted from flash discharge tubes LB, LG, and LR. Light measuring circuit LM1 integrates the output of light receiving element PD1 and converts the integrated value into a signal suitable for the processing in the later stage. As mentioned earlier, the output of light measuring circuit LM1 is transmitted to emitted light control circuits CB, CG, and CR, and at the same time, is input into dividing circuit DV1. Spot light receiving element PD2 receives the light rays incident upon a small area on the easel plane. Light receiving element PD2 can be manually moved on the easel plane EA for setting it at any desired position, and it can be removed from the easel plane when not in use. Light measuring circuit LM2 integrates the output of spot light receiving element PD2 and converts the integrated value into a signal suitable for processing in the later stage. This output is also input into dividing circuit DV1, which generates an output signal corresponding to the ratio of the outputs of both light measuring circuits LM1 and LM2. The output signal of dividing circuit DV1 is input into both reciprocal calculation circuit IV and demultiplexor DM1 in FIG. 3. Demultiplexor DM1 starts its operation in response to a "High" signal from an output terminal AM of the control circuit CA in FIG. 2, and distributes the output of dividing circuit DV1 into three multipliers MU1, MU2, and MU3 in response to "High" signals which are to be sequentially supplied from output terminals BF, GF, and RF of control circuit CA. Those multipliers MU1, MU2, and MU3 perform an identical operation described later based on the output of division circuit DV1 and that of the aforementioned setting circuits BS, GS, and RS. The outputs of the multipliers MU1, MU2, and MU3 thus obtained are input to the respective demultiplexors DM2, DM3, and DM4. Switches #1S, #S, and #3S in FIG. 2 are selectively closed according to the first, second, and third measuring operation. When "High" signals are sequentially generated from output terminals #1, #2, and #3 of control circuit CA, demultiplexors DM2, DM3, and DM4 will distribute, in response to the "High" signals, the output of the multipliers MU1, MU2, and MU3 to the respective memory circuits ME4–ME12.

Figure 3:
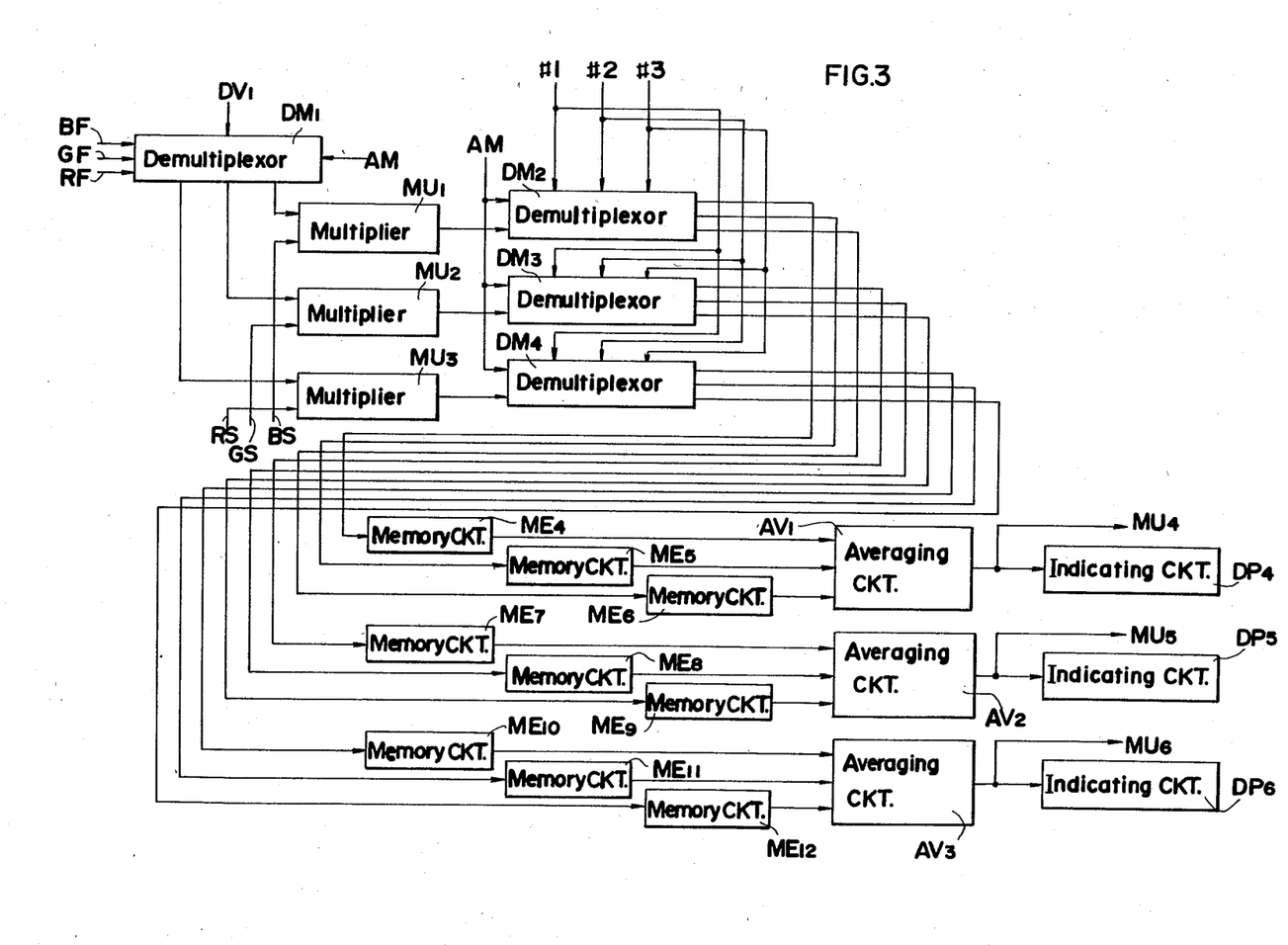
FIG. 3 and FIG. 4 are block diagrams showing the essential parts of the respective embodiment of the present invention.

Averaging circuits AV1 averages the outputs of memory circuits ME4, ME5 and ME6 and memorized the averaged result, averaging circuit AV2 averages the output of memory circuits ME7, ME8, and ME9 and memorises the averaged results, and averaging circuit AV3 averages the outputs of memory circuits ME10, ME11, and ME12 and memorises the averaged result. Averaging circuits AV1, AV2 and AV3 generate signals corresponding to the mean values obtained, respectively. Display circuits DP4, DP5 and DP6 display the values corresponding to the outputs of respective averaging circuits AV1, AV2, and AV3.

Figure 2:
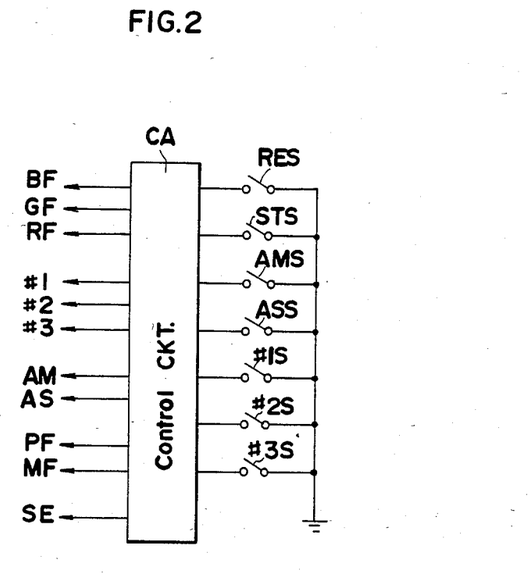
FIG. 2 is a block diagram showing control circuit (CA) for controlling the operational timing of each section of the color enlarger.
Figure 4:
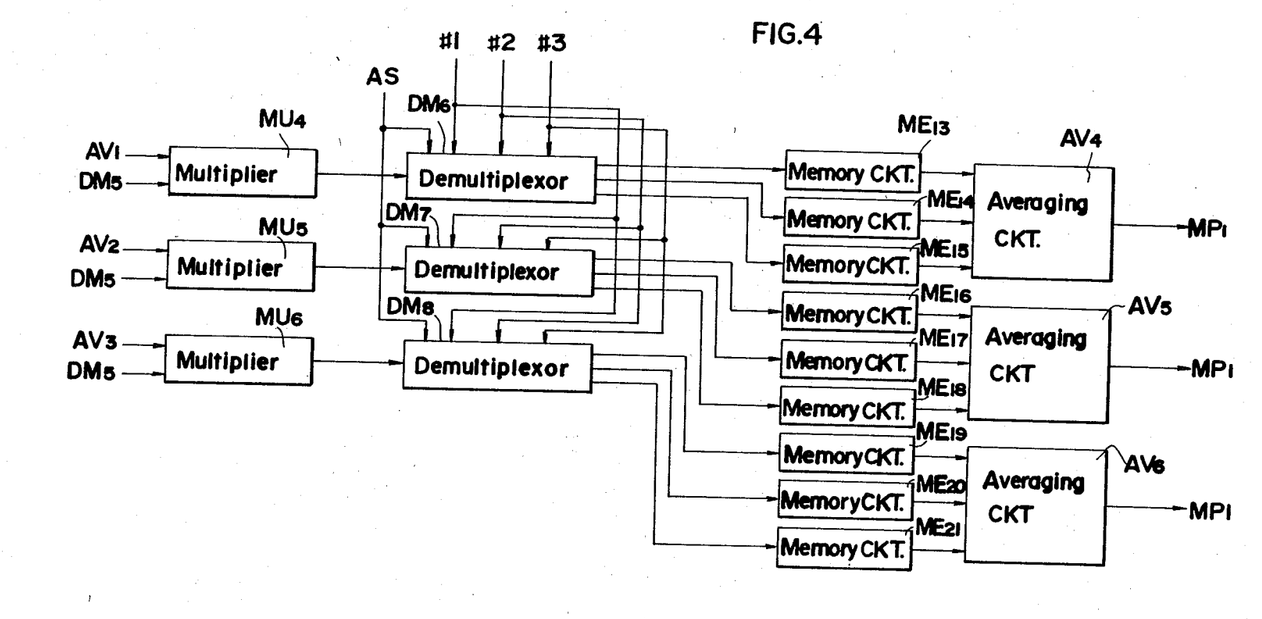

Now returning to FIG. 1, demultiplexor DM5 is activated by a "High" signal from an output terminal AS of the control circuit CA in FIG. 2, and distributes the output of the dividing circuit DV1 which is input thereto via reciprocal number calculating circuit IV to respective multipliers MU4, MU5 and MU6 (shown in FIG. 4) in response to "High" signals that are generated sequentially from output terminals BF, GF and RF of control circuit CA. In FIG. 4, multipliers MU4, MU5 and MU6 multiply the signals commensurate with the reciprocal of the values calculated in the dividing circuit DV1, by the outputs of the respective averaging circuits AV1, AV2, and AV3. The outputs of the multipliers MU4, MU5 and MU6 are distributed by demultiplexors DM6, DM7, and DM8 to memory circuits ME13 to ME21 in response to "High" signals from output terminals #1, #2, and #3 of control circuit CA. Averaging circuits AV4, AV5 and AV6 compute respectively the mean values of output and the three memory circuits memorizes the mean values and generates signals corresponding to the respective mean values. The output signals of averaging circuits AV4, AV5, and AV6, are memorized by memory circuits ME1, ME2 and ME3 via multiplexor MP1 illustrated in FIG. 1. At this stage, multiplexor MP1 allows memory circuits ME1, ME2 and ME3 to memorize the outputs of averaging circuits AV4, AV5 and AV6 while "High" signal is being generated at output terminal SE of control circuit CA, and to memorize the outputs of setting circuits BS, GS and RS when said terminal generates "Low" signal.

Indicating circuits DP1, DP2 and DP3 display the data memorized by the respective memory circuits ME1, ME2, and ME3. Although the above embodiment has been described as comprising blocks of the control circuits, computing circuits, memory circuits, multiplexors, demultiplexors, etc., in practice, the system may be composed of a microprocessor which is programmed to perform the functions of those blocks.

Next, an explanation is made about the operation of the above system. The relationship between the switches connected to control circuit CA and its outputs will be revealed in the following explanation.

TEST PRINTING

A standard negative film is set in the well known manner to film position FL, and proper light amount data are manually set in the respective setting sections BS, GS, and RS. The signals corresponding to the set data are memorized by memory circuits ME1, ME2, and ME3 via multiplexor MP1 and are displayed by indicating circuits DP1, DP2, and DP3. When exposure starting switch STS illustrated in FIG. 2 is turned ON, the output terminal MF of control circuit CA will turn to a "High" level thereby activating light emission control circuits CB, CG and CR, which, as described before, is constructed to fire flash tubes LB, LG and LR to emit flash light at required times by a prescribed amount, so that the necessary amounts of light emission corresponding to the data memorized in memory circuits ME1, ME2, and ME3 may be obtained. In this condition, when printing start switch STS is turned ON, the light emission start signals will be generated in sequence from terminals BF, GF and RF of control circuit CA. As the result, flash discharge tubes LB, LG and LR emit light once by once and repeat the light emission. Since the amount of light emission at each time is controlled in a manner as described before, the light emission of flash discharge tube LB, LG and LR terminates in approximately the same time regardless of a color balance to be set. At the time of the test printing, the printing on a printing paper is made in the above light emitting control operation. This printing paper exposed is processed and its finishes are observed. Should an unsatisfactory result be obtained, the same operation is repeated with the set values at setting sections BS, GS, and RS being altered.

Analysis Memory (Correcting Operation)

When a best print is obtained, the conditions of the setting sections BS, GS and RS are left as they are and light receiving portion PD2 is located at a desired position on easel plane EA.

When both analysis switch AMS and switch #1S are turned ON, terminals AM, PF and #1 of control circuit CA will turn to "High" levels. In addition, from terminals BF, GF, and RF will be sequentially output light emitting start signals, which will activate flash tubes LB, LG and LR to sequentially emit flash light by the prescribed amount. Assuming the amounts of light measured for each primary color by light receiving element PD2 light measuring circuit LM2 and for spot monitoring on the easel plane are EB11, EG11 and ER11 respectively. And assuming the amount of light monitored for each primary color by light monitoring circuit LM1 are MBm11, MGm11 and MRm11 respectively, dividing circuit DV1 sequentially calculates the following values;

EB11/MBm11
EG11/MGm11
ER11/MRm11

The obtained data is sequentially input to the multipliers MU1, MU2 and MU3 respectively via demultiplexor DM1. Next, assume the data from setting sections BS, GS, and RS for primary colors are XBS, XGS and XRS respectively, the multipliers MU1, MU2 and MU3 perform the following calculations.

$$EBt1 = XBs \times EB11/MBm11$$

$$EGt1 = XGs \times EG11/MGm11$$

$$ERt1 = XRs \times ER11/ERm11$$

The calculated data EBt1, EGt1 and ERt1 are memorized by memory circuits ME4, ME7 and ME10 via demultiplexors DM2, DM3 and DM4 respectively.

Now, an explanation is made for the meaning of those calculations.

The analysis memory operation is made for purpose of measuring the condition of the light source and optical system when the best print is obtained. The value of EB11/MBm11 under the condition where the best print was obtained, represents the ratio, with respect to the blue light, between the total amount of light to be emitted from flash tube LB and the light amount which arrived at the easel plane after it has been emitted from the flash tube LB. Thus, since the total amount of light emission set with respect to the blue color is XBs, EBt1 is an amount of the light incident upon the easel plane (i.e., light receiving element PD2) when the flash tube was fired so as to emit the light based on the set value amount EB11. Consequently, as long as printing papers having the same sensitivity as that of the best print, proper printing can be made under the condition where the best print was obtained regardless of the optical system and film used, if the amount of light emission is controlled such that the amount of light equivalent to EBt1 will be incident upon the part of the easel plane that has the same condition as that where light receiving element PD2 received light.

Next, the measuring point of light receiving element PD2 is altered by the operator. In this condition, switches AMS and #2S are turned ON, thereby terminals AM PF and #2 of control circuit CA will turn to "High" levels. In a like manner as described above, the following computation will be made:

$$EBt2 = XBs \times EB12/MBm12$$

$$EGt2 = XGs \times EG12/MGm12$$

$$ERt2 = XRs \times ER12/MRm12$$

Those computed data EBt2, EGt2 and ERt2 are memorized by memory circuits ME5, ME8 and ME11 respectively.

Further, the measuring point of light receiving element PD2 is altered by the operator. In this condition, switches AMS and #3S are turned ON, thereby terminals AM, PF and #3 of control circuit CA will turn to "High" levels. In the same manner as described above, the following computation will be performed:

$$EBt3 = XBs \times EB13/MBm13$$

$$EGt3 = XBs \times EG13/MGm13$$

$$ERt3 = XRs \times ER13/MRm13$$

Those computed data EBt3, EGt3 and ERt3 are memorized by memory circuits ME6, ME9 and ME12 respectively.

Averaging circuits AV1, AV2, and AV3 compute mean values EBta, EGta and ERta for each primary color based on the data from the respective memory circuits ME4 to ME12. Those mean values are obtained by performing the following computation:

$$(EBt1 \times EBt2 \times EBt3)^{\frac{1}{3}} = EBta$$

$$(EGt1 \times EGt2 \times EGt3)^{\frac{1}{3}} = EGta$$

$$(ERt1 \times ERt2 \times ERt3)^{\frac{1}{3}} = ERta$$

Also, when only two data for each color are memorized by memory circuits ME4, ME5, ME7, ME8, ME10 and ME11, averaging circuits AV1, AV2 and AV3 perform the following computation:

$$(EBt1 \times EBt2)^{\frac{1}{2}} = EBta$$

$$(EGt1 \times EGt2)^{\frac{1}{2}} = EGta$$

$$(ERt1 \times ERt2)^{\frac{1}{2}} = ERta$$

When only one data for each color is memorized by memory circuits ME4, ME7 and ME10, averaging circuits AV1, AV2 and AV3 generate their data as EBta, EGta and ERta respectively. The data EBta, EGta and ERta from averaging circuits AV1, AV2 and AV3 as described above, are displayed at indicating circuits DP4, DP5 and DP6 respectively.

ANALYSIS START (MEASURING OPERATION)

Light receiving element PD2 is located at a desired position on the easel plane EA after a film to be printed is set and the enlarging optical system is adjusted. When analysis start switch ASS and switch #1S are turned ON, terminals AS, PF and #1 of control circuit CA turn to "High" levels. Then, from terminals BF, GF and RF are sequentially output light emission start signals. Whereupon, flash discharge tubes LB, LG and LR sequentially emit the prescribed amount of light. Assuming the amounts of respective color lights received by light receiving element PD1 at this time is MBm21, MGm21 and MRm21 respectively and assuming the amounts of respective color lights received by light receiving element PD2 are EB21, EG21 and ER21 respectively, the data given by following formulae are sequentially generated via dividing circuit DV1 and reciprocal number calculating circuit IV.

MBm21/EB21
MGm21/EG21
MRm21/ER21

Those data are supplied to the multipliers MU4, and MU5 and MU6 respectively via multiplexor DM5. The multipliers MU4, MU5 and MU6 perform following calculations respectively.

$$EBta \times MBm21/FB21 = XBt1$$

$$EGta \times MGm21/EG21 = XGt1$$

$$ERta \times MRm21/ER21 = XRt1$$

Those calculated data XBt1, XGt1 and XRt1 are memorized by memory circuits ME13, ME16 and ME19 via demultiplexor CM6, DM7 and DM8 respectively.

Next, the position of light receiving element PD2 on easel plane EA is changed by the operator. In this condition, switches ASS and #2S are turned ON, terminal AS, PF and #2 of control circuit CA will turn to "High" levels. Whereupon, from terminal BF, GF and RF are sequentially generated light emitting starting signals. In the similar manner as mentioned above, the following computations are performed:

$$EBta \times MBm22/EB22 = XBt2$$

$$EGta \times MGm22/EG22 = XGt2$$

$$ERta \times MRm22/ER22 = XRt2$$

Those data XBt2, XGt2 and XRt2 are memorized by memory circuits ME14, ME17 and ME20 respectively.

Further, in the similar manner, the position of light receiving element PD2 is changed. In this condition, switches ASS and #3S are turned ON, the system performs similar calculations shown below:

$$EBta \times MBm23/EB23 = XBt3$$

$$EGta \times MGm23/EG23 = XGt3$$

$$ERta \times MRm23/ER23 = XRt3$$

Those data XBt3, XGt3 and XRt3 are memorized by memory circuits ME15, ME18 and ME21 respectively.

Averaging circuits AV4, AV5 and AV6 perform the computations shown below and produce data XBta, XGta and XRta respectively:

$$XBta = (XBt1 \times XBt2 \times XBt3)^{\frac{1}{3}}$$

$$XGta = (XGt1 \times XGt2 \times XGt3)^{\frac{1}{3}}$$

$$XRta = (XRt1 \times XRt2 \times XRt3)^{\frac{1}{3}}$$

Also, when only two data are memorized by respective memory circuits ME13, ME14, ME16, ME17, ME19 and ME20, averaging circuits AV4, AV5 and AV6 generate the following data respectively:

$$XBta = (XBt1 \times XBt2)^{\frac{1}{2}}$$

$$XGta = (XGt1 \times XGt2)^{\frac{1}{2}}$$

$$XRta = (XRt1 \times XRt2)^{\frac{1}{2}}$$

When only one data is memorized by respective memory circuits ME13, ME16 and ME19, the following data are generated as their mean values respectively:

$$XBta = XBt1$$

$$XGta = XGt1$$

$$XRta = XRt1$$

When analysis start switch ASS has been turned ON, and when light amount data XBta, XGta and XRta have been generated by averaging circuits AV4, AV5 and AV6, control circuit CA generates a "High" level signal from terminal SE and multiplexor MP1 generates signals of data XBta, XGta and XRta provided by averaging circuits AV4, AV5 and AV6.

PRINTING OPERATION

When start switch STS is turned ON, the output terminal MF of control circuit CA turns to a "High" level, light emitting start signals are sequentially generated from terminals BF, CF and MF. The signals of data XBta, XGta, and XRta are provided to the respective light emitting control circuits CB, CG, and CR. Therefore, the light emission control is performed in the same manner as that of test printing based on the computed data XBta, XGta and ERta of the amount of light to be emitted.

In the above embodiment, an explanation is made with respect to the case where the present invention is applied to a color enlarger of additive type, but yet the present invention may be applicable to a color enlarger of subtractive type as well. Namely, the latter is to be provided with three light receiving sections which receives the red, green and blue, i.e. R, G and B components of the emitted light respectively for monitoring use. In addition, three light receiving sections are provided for receiving R, G and B component of the light incident on the easel plane. Should the ratio of monitored amount of light emission and measured light amount on the easel plane be obtained for each color component at each light measurement, an average exposure amount for each color component can be obtained in the same manner as that of the above embodiment. It should be noted that in the case of the subtractive type color enlarger, instead of controlling the amounts of light emitted from the light emitting portion for respective color components, the area of dichroic filter located in the light path for printing may be changed based on the data of the exposure amount for each color component. Also, in the indication of the data for the subtractive type color enlarger, the exposure amount for R component may be displayed as an exposure amount data and the ratio of the exposure amount between R and G, and that between R and B may be displayed for the purpose of color balance indication.

Furthermore, since the amount of light emitted from the flash discharge tube is changed on each emission, the light receiving element PD, and the light measuring circuit LM1 are provided for monitoring said amount in the embodiment. However, if the amount of light emission of a light emitting device is constant for a constant emitting signal, the above monitoring device is not necessary. In this case, the output of the light measuring circuit LM2 is directly connected to the memory circuits ME4 to ME12 and to the multiplier MU4 to MU6.

Although the present invention has been described for the application to the color negative film, the present invention is also applicable for use with the color positive film in the same way as described above. In addition, the present invention is applicable to use for printing a monochromatic film on a variable contrast paper which varies its contrast according to the ratio of the exposure amount between B and G components.

Additionally, the easel plane is not limited to the one installed in the conventional enlarger. To obtain greater enlarging rate, the image can be projected on a floor or the like with the easel being removed. Therefore, it should be noted that in the present description the plane where the printing paper is placed is generally called an easel plane.

Thus, according to the present invention, the proper condition for printing is determined based on the measured values for a plurality of points of the standard negative film image under the exposure conditions where a best print was obtained for the standard negative film. Further, the proper condition is determined by the mean values of the plural points in the negative image. Hence the data are affected little by the difference in the conditions of the measuring points in the standard negative image and the printing negative image. Furthermore, according to the embodiment, since the proper condition is determined by the device itself, skill and difficult operation are not required for the operator.

What is claimed is:

1. An exposure determining device for use in an enlarger having a light emitting device for printing a printing paper located on a predetermined plane, comprising:
   means for setting the amount of light to be emitted from said light emitting device for each of the primary colors to generate setting signals representative thereof;
   means for controlling the amount of light emission of said light emitting device for each of the primary colors in accordance with said setting signals;
   means for monitoring the amount of light emitted actually from said light emitting device for each of the primary colors to generate monitoring signals representative thereof;
   means, including a light receiving element movable on said predetermined plane, for measuring the amount of light received by said light receiving element for each of the primary colors to generate measuring signals representative thereof;
   means for calculating the ratio of said measured amount of light to said monitored amount of light for each of the primary colors to generate ratio signals representative thereof;
   means for selecting a first mode when a predetermined standard film is set in said enlarger and a second mode when a film to be printed is set in said enlarger;
   means for averaging a plurality of said calculated ratios for each of the primary colors based on said ratio signals and for memorizing averaged signals representative of said averaged ratios, said plurailty of said calculated ratios being calculated by a plurality of light emissions of said light emitting device with the position of said light receiving element being altered when said first mode is selected, and
   means for determining the proper exposure amount for each of the primary colors by means of calculation based on said averaged signals and plurality of said ratio signals calculated by a plurality of light emissions of said light emitting device with the position of said light receiving element being altered when said second mode is selected, said determining means generating determining signals each representative of said determined exposure amount for each of the primary colors.

2. An exposure determining device as claimed in claim 1, wherein said averaging and memorizing means includes means for calculating amount of light incident on said light receiving element according to the set amount of light for each of the primary colors based on said setting signals, said monitoring signals, and said measuring signals to generate calculated amount signals representative thereof, means for memorizing a plurality of said calculated amount signals for each of the primary colors, and means for averaging said plurality of said calculated amount signals memorized for each of the primary colors.

3. An exposure determining device as claimed in claim 2, wherein said amount of light calculating means includes means for multipling said calculated ratio by said set amount based on said ratio signals and said setting signals.

4. An exposure determining device as claimed in claim 1, wherein said determining means includes means, at each light emission, for calculating a value which corresponds to a ratio of the said ratio signal to said averaged signal for each of primary colors to generate calculated signals representative thereof, means for memorizing said calculated signals, and means for averaging said calculated signals.

5. An exposure determining device as claimed in claim 1, further comprising means for indicating information relating to a proper exposure amount for said predetermined standard film based on said averaged signals.

6. An exposure determining device as claimed in claim 1, further comprising means for indicating information relating to the proper exposure amount based on said determining signals.

7. An enlarger having a light emitting device in which the amount and color balance of light to be emitted therefrom are controllable, comprising:
   means for setting the amount and color balance of light to be emitted from said light emitting device to produce setting signals representative thereof;
   means for controlling the amount and color balance of light emission of said light emitting device in accordance with said setting signals;

means for measuring the amount and color balance of light at a plurality of points within a predetermined plane on which a printing paper would be located to produce measuring signals representative thereof;

means for selecting a first mode in which a predetermined standard film is set in said enlarger and a second mode in which a film to be printed is set therein;

means for averaging said measuring signals to obtain an averaged amount and averaged color balance of light received on said predetermined plane, said averaging means producing averaged signals rerpesentative of said averaged amount and averaged color balance of light when said first mode is selected, and means for determining a proper amount and color balance of light received on said predetermined plane for said film to be printed based on the plurality of said measuring signals and said averaged signals to produce determining signals representative thereof when said second mode is selected.

8. An enlarger as claimed in claim 7, further comprising means for monitoring the amount and color balance of light emitted actually from said light emitting means to produce a monitoring signal representative thereof, and means for calculating the ratio of said measuring signal to said monitoring signals to produce ratio signals representative thereof, wherein said averaging means averages the plurality of said ratio signals.

9. An enlarger as claimed in claim 7, further comprising means for indicating information relating to said averaged amount and color balance of light in accordance with said averaged signals.

10. An enlarger as claimed in claim 7, further comprising means for indicating information relating to the proper amount and color balance of light on said predetermined plane for said film to be printed in accordance with said determining signals.

11. An enlarger as claimed in claim 7, wherein said measuring means includes a light receiving element movable on said predetermined plane, whereby said measuring means measures the amount and color balance of light on said plurality of points by means of measuring for a plurality of light emissions of said light emitting means with the position of said light measuring element being altered.

12. An enlarger as claimed in claim 7, further comprising means for selecting an analyzing mode when said proper amount and color balance of light are being determined and a printing mode when said film to be printed is printed, and means for controlling the amount and color balance of the light emission of said light emitting device in accordance with said determining signals when said printing mode is selected.

* * * * *